United States Patent [19]
Medici et al.

[11] Patent Number: 6,078,019
[45] Date of Patent: Jun. 20, 2000

[54] WIRE TRANSPORT SYSTEM FOR AN ELECTRICAL DISCHARGE MACHINING APPARATUS

[75] Inventors: Brenno Medici, Peccia; Peter Wehrli, Auressio, both of Switzerland

[73] Assignee: Agie Industrial Electronics Ltd., Switzerland

[21] Appl. No.: 08/807,238

[22] Filed: Feb. 28, 1997

[51] Int. Cl.[7] .................................................. B23H 7/10
[52] U.S. Cl. ........................................................ 219/69.12
[58] Field of Search ......................................... 219/69.12

[56]  References Cited

U.S. PATENT DOCUMENTS

| | | | |
|---|---|---|---|
| 4,985,608 | 1/1991 | Morishita et al. | 2319/69.12 |
| 5,006,692 | 4/1991 | Magara et al. | 219/69.12 |
| 5,073,691 | 12/1991 | Magara et al. | 219/69.12 |
| 5,281,787 | 1/1994 | Arakawa | 219/69.12 |
| 5,340,958 | 8/1994 | Okazaki et al. | 219/69.12 |
| 5,495,086 | 2/1996 | Onandia | 219/69.12 |
| 5,523,538 | 6/1996 | Matsuda | 219/69.12 |

FOREIGN PATENT DOCUMENTS

| | | | |
|---|---|---|---|
| 59-14428 | 1/1984 | Japan | 219/69.12 |
| 64-16322 | 7/1987 | Japan . | |
| 62-188627 | 8/1987 | Japan . | |
| 62-215474 | 9/1987 | Japan . | |
| 64-16323 | 1/1989 | Japan | 219/69.12 |
| 1-135426 | 5/1989 | Japan . | |
| 3-49830 | 3/1991 | Japan | 219/69.12 |
| 3234425 | 10/1991 | Japan . | |
| 5-92322 | 4/1993 | Japan | 219/69.12 |
| 5-185332 | 7/1993 | Japan . | |

*Primary Examiner*—Geoffrey S. Evans
*Attorney, Agent, or Firm*—Gifford, Krass, Groh, Sprinkle, Anderson & Citkowski, P.C.

[57]  ABSTRACT

A wire transport system for an electrical discharge machining apparatus with at least one wire electrode includes a wire supply, a wire tensioner and/or a wire disposer arranged such that the entire wire transport is automated. The wire is automatically transported from the wire supply to a processing zone, in particular, by a fluid. Due to the elimination of fluctuations in the uniform movement of the wire, a wire transport with less vibration is attained, and the processing quality is improved. In addition, a higher reliability is achieved.

19 Claims, 7 Drawing Sheets

WIRE TRANSPORT SYSTEM FOR AN ELECTRICAL DISCHARGE MACHINING APPARATUS

FIELD OF THE INVENTION

The invention pertains to a wire transport system for an electrical discharge machining apparatus which comprises at least one wire electrode as well as means for supplying, tensioning and disposing of the wire.

BACKGROUND OF THE INVENTION

Systems of this type usually consist of a wire supply, e.g., in the form of one or more supply coils, transport means for transporting the wire from the supply coil to the processing section and away from the processing section, tensioning means for subjecting the wire to a suitable tension for processing the workpiece, and disposal means for disposing of the used wire.

One system for the partially automated transport of a wire from the unwinding section (A) to the processing zone is already known from DE 34 19 944 C1 (FIG. 4) by the applicant. This system is very complicated technically. The operational reliability of this system is not satisfactory because the wire can fall out of the transport system in case of a malfunction and lead to interruptions in the spark erosion process. In addition, the wire feed by means of belt guide elements can lead to differences in the speed of the two belt guide elements that surround the wire, in particular, at the deflection points. These differences in speed manifest themselves in the form of fluctuations in the uniform movement of the wire. The belt guide elements shown in this patent are also subject to significant wear. These belt guide elements are not suitable for attaining a comprehensive solution because movements of the machine components that occur cannot be compensated by the belt guide elements and each transfer of the wire influences the operational reliability.

During the removal of the wire, vibrations may occur because the wire is wound onto the supply coil in several layers one on top of the other, as well as side by side. In order to prevent these vibrations, the unwinding direction of the wire should be as vertical as possible with respect to the axis of the supply coil. In U.S. Pat. No. 5,281,787, this is realized with an intermediate roller that is geometrically constructed in such a way that it always unwinds the wire in linear fashion independently of the current separation point from the supply coil. However, such an intermediate roller would require excessive space because, the greater the wire diameter, the larger the curvature radius of the deflection rollers must be to prevent undesired deformations of the wire. This roller would have to have the conventional diameter for deflection rollers even at its narrowest point.

The same objective is attained in DE 89 12 810 C1 by axially displacing the entire supply coil. However, this also requires excessive space as well as a corresponding drive unit.

One known device for controlling the motor of the supply coil is described below. After the stabilizing deflection roller(s), the wire extends around one or two additional deflection rollers in opposite senses, i.e., clockwise around one deflection roller and counterclockwise around the second deflection roller. In this case, at least one of the two deflection rollers is mounted in spring-loaded fashion. Measuring means determine the respective wire tension or tensile force by means of the positions of this deflection roller, the spring element and/or additional auxiliary means, with a control unit controlling the coil motor in accordance with these measured values and/or nominal values. Consequently, a certain basic tension exists between the supply coil and the braking means. This basic tension can be adjusted, which is important when different types of wires are used. For example, the use of thinner wires requires a correspondingly lower basic tension.

Several disclosures pertaining to wire exchange systems or multiple wire supplies have been made. However, all these documents are associated with significant disadvantages, in particular, because the wire must be manually transported to the wire guide head. Improved methods for connecting the old wire and the new wire have been disclosed. U.S. Pat. No. 5,340,958 discloses a wire exchange system in which the end of the old wire is connected to the beginning of the new wire by means of welding in order to insert the new wire into the wire transport system. However, this particular document is also subject to several limitations. In order to insert a new electrode, a wire electrode must already be present in the wire drive because the wire would otherwise have to be inserted manually. In addition, different wire diameters and wire qualities are frequently utilized, i.e., a reliable connection cannot be ensured.

FIG. 6 of DE 34 19 944 C1 shows a multiple wire supply that transfers the wire to a supply section. However, this system requires mechanized holding means that can be controlled individually for each wire coil. A wire transfer without holding means is not reliably ensured.

DE 34 19 944 C1 describes braking means arranged in front of the first guide head which make it possible to process the workpiece under a higher wire tension than that in the wire supply section. Consequently, the components within the latter section are subjected to lesser wear. A significantly lower tension in the wire between ensuing braking and tensioning rollers during the removal from the wire supply coil is particularly practical because an excessively high force within the first section would lead to blocking of the wire on the coil.

In the aforementioned braking means, the threaded wire is wrapped at least nearly once around a braking roller that is driven by a braking motor. In this case, the wire is effectively engaged with the braking roller by means of frictional forces.

EP-541,126 discloses a method in which the tension of the wire electrode is adjusted by different speeds of the tensioning and braking motor.

The previously mentioned braking roller may be arranged in a housing. DE 34 19 344 C1 discloses several devices for automating the threading process within this section of the wire transport system. Among other things, this document describes a device in which the wire enters the housing through an opening and initially adjoins the braking roller in essentially tangential fashion. In this case, at least one additional opening introduces fluid streams at least during the threading process. These fluid streams extend essentially tangential to the braking roller and guide the wire around the braking roller. Consequently, an automatic threading process, in which hardly any wear occurs, is attained.

U.S. Pat. No. 5,073,691 describes wire disposal means. These wire disposal means contain a suction nozzle and at least one pipe arranged behind the second guide head. In this case, the suction nozzle attracts the wire and a fluid by suction during the threading process and transports said wire through the pipe to the tensioning motor. This method makes it possible to automate the threading process within the wire disposal section without having to provide components that are particularly susceptible to wear. In comparison to conventional belt transport system, this is particularly advantageous. Changes in the moving direction of the wire are preferably realized by means of deflection rollers that are driven by a fluid jet at least during the threading process. This allows a precise wire disposal with slight vibration.

In order to reduce the volume of the used wire, a wire cutting device may be arranged behind the tensioning motor. When adjusting a rotational speed that is proportional to the moving speed of the wire, it is ensured that the wire is divided into identically long pieces during its disposal, independently of its moving speed. Consequently, a back-up in the disposal container can be prevented. Such a device is described in EP-198,229 by the present applicant.

The deflection rollers and/or braking roller used are usually constructed as a cylindrical disk, in the outer surface of which a uniform, circumferential groove is arranged. In this case, the groove is tapered symmetrically to the center of the other surface and in the direction toward the disk center. Such rollers allow a precise wire guidance with practically no vibrations and thus improve the processing quality on the workpiece. In addition, rollers of this type can be used for wires with different diameters. When used as a braking roller, such a V-groove increases the friction between the braking roller and the wire.

The individual components of a wire transport system can be realized in various ways. Satisfactory solutions, particularly with respect to the processing section and the disposal section, are disclosed in the state of the art. However, the solutions for the supply section which have been disclosed so far are not satisfactory.

SUMMARY OF THE INVENTION

Originating from the aforementioned state of the art, the invention is based on the objective of disclosing an improved concept for a wire transport system with respect to quality, reliability and automation. These improvements pertain, in particular, to the supply section.

According to the invention, this objective is attained with a pipe arrangement for the wire transport system of an electrical discharge machining apparatus which is designed such that the wire electrode is inevitably and automatically transported from the unwinding section (A) to the processing zone.

An injector nozzle and one or more pipe(s) are preferably arranged after the unwinding section, i.e., behind the stabilizing deflection roller(s) or additional deflection rollers. In this case, the injector nozzle attracts the wire by suction at least during the threading process and subsequently transports the wire to the processing zone through the pipe(s) by means of a fluid stream (claim 2). This measure allows a partial automation of the threading process. Consequently, the handling of the machine is simplified and time savings are attained. In this case, changes in the moving direction of the wire in the pipe(s) are preferably realized by means of deflection rollers (claim 3).

Consequently, a wire transport with little friction is attained. This effect is intensified if a fluid stream drives the deflection rollers (claim 4). Rollers of this type allow a wire transport with minimal friction. Consequently, deformations are prevented, vibrations and wear are reduced, and the risk of wire breakage is reduced.

According to a preferred embodiment, the pipe arrangement is constructed at least partially in telescopic fashion. This measure prevents distortions and deformations of the pipe arrangement, in particular, while individual machine components are moving.

The housings of the deflection rollers are preferably mounted on rotating axles such that the individual machine components can move relative one to another and the deflection units are always aligned one to another. This measure is also particularly practical if individual machine components move relative to one another and prevents distortions and deformations of the pipe arrangement.

The extension of the rotational axis of the deflection roller housing preferably coincides with the separation point of the wire from the deflection roller and preferably also with the wire progression directly before or after the respective deflection roller housing (claim 6). Thus it is ensured that the coordinates of the wire separating point remain constant despite the rotation of the deflection roller housing, i.e., the position of the transported wire is not changed and fluctuations in the uniform movement of the wire are reduced.

In another preferred embodiment, the wire being unwound from the supply coil is initially guided around at least one stabilizing deflection roller. In this case, the stabilizing deflection roller(s) is/are arranged on a swivel arm. This makes it possible to minimize longitudinal vibrations of the wire, i.e., vibrations in the wire feed direction. Such vibrations would normally be caused because the wire is wound onto the supply coil in several layers one on top of the other as well as side by side. A stabilizing deflection roller that is arranged on a swivel arm can follow this progression and prevent jumps over the respectively adjacent layers or at least limit their effects. Consequently, the entire wire transport becomes more uniform, the wire itself is deformed less and the processing quality on the workpiece is improved accordingly. It is, in particular, possible to reduce the roughness of the processing surface. In comparison to known solutions, the invention is, in particular, characterized by a reduced space requirement and lower costs.

The rotational axis of the swivel arm is preferably arranged essentially vertical to the rotational axis of the supply coil and/or the rotational axis (axes) of the stabilizing deflection roller(s). Thus, the swivel arm is able to follow the wire arrangement on the supply coil in particularly uniform fashion.

In an additional preferred embodiment, the separation point of the wire from the (or the first) stabilizing deflection roller and the separation point of the wire from the supply coil continuously lie essentially vertically on top of the other during the unwinding process. Thus, "jumps" of the wire over adjacent layers are prevented, i.e., a particularly uniform wire transport is ensured.

The extension of the rotational axis of the swivel arm preferably coincides with the separation point of the wire from the (or the last) stabilizing deflection roller and preferably also the wire progression directly behind the last stabilizing deflection roller. Thus it is ensured that the coordinates of the wire separation point remain constant despite the rotation of the swivel arm, i.e., the position of the transported wire is not changed. The reduction of fluctuations in the uniform movement of the wire is also attained in particularly effective fashion in this embodiment.

In addition, the wire unwinding section is preferably entirely or partially constructed doubly or multiply, with additional auxiliary means for transferring the wire to the injector nozzle preferably being provided in this case. Thus, the coil exchange can be largely or entirely automated.

The wire transport system according to the invention is realized such that the wire situated within the intake section of the injector nozzle is inevitably guided into the transport pipe. Except for the coil motor(s), no additional wire feed means are required within the supply section. Consequently, this solution represents a significant improvement in comparison to the state of the art.

In one additional preferred embodiment, the wire electrode is guided around the braking roller by means of a fluid. This embodiment allows an automatic insertion of the wire into this section of the wire transport with hardly any wear. In comparison to known embodiments, it is possible to construct the braking roller housing in less complicated fashion.

Alternatively, threading means for this section of the wire transport system are preferably utilized. In this case, the wire is guided around the braking roller by means of a flexible guide pipe.

In one preferred embodiment, the braking roller comprises bevels in its circumferential surface which inevitably guide the wire in the V-groove formed thereby during the rotation of the braking roller. Consequently, the manual placement of the wire onto the braking roller is simplified.

BRIEF DESCRIPTIONS OF THE DRAWINGS

The invention is described in detail below with reference to several embodiments and the enclosed figures.

DETAILED DESCRIPTION OF THE PREFERRED EMBODIMENTS

Figure 1:
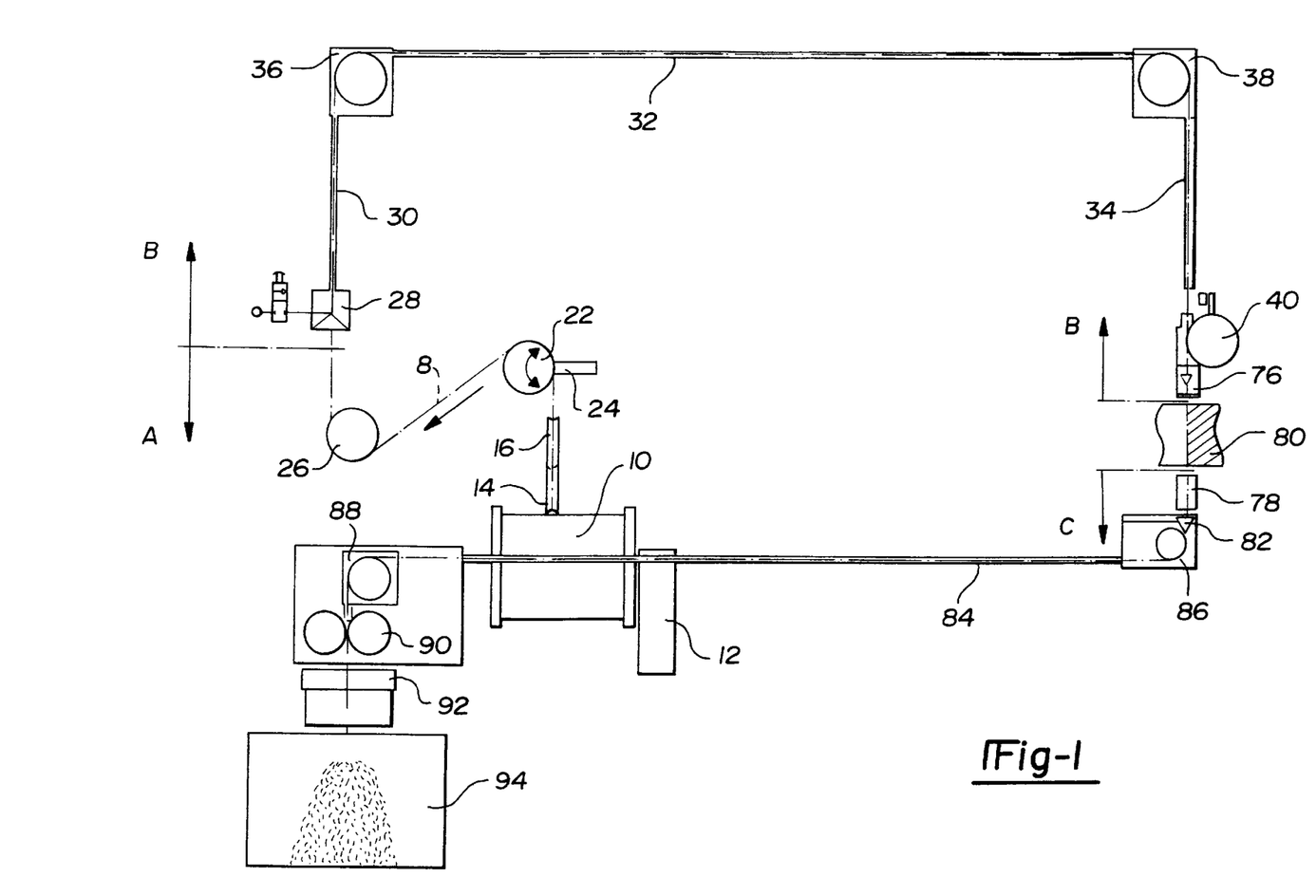
FIG. 1 is, a schematic representation of a wire transport system.

FIG. 1 shows a general overview of a wire transport system for an electrical discharge machining apparatus according to the invention. In this case, one can distinguish between three sections that surround the processing zone (at the workpiece 80). An unwinding section A and a supply section B are arranged upstream of the processing zone. A disposal section C is arranged downstream of the processing zone.

The designs of the individual sections A, B and C as well as their cooperation are essential for the present invention. Consequently, it is sensible to initially discuss these sections individually. In the first part (I) of the following description, all characteristics that are not important for the cooperation of the respective sections are not taken into consideration. The cooperation between the individual sections is discussed in the ensuing second section (II) of the description.

I. The Individual Sections
1. The Unwinding Section A

FIG. 1 shows that the wire 8 is initially situated on a supply coil 10. Consequently, it is inevitable that the wire 8 is wound around the core of the supply coil 10 in several layers that lie on top of another as well as side by side. This leads to irregularities and fluctuations during the unwinding process which the invention aims to minimize with the unwinding section A according to the invention.

Figure 2:
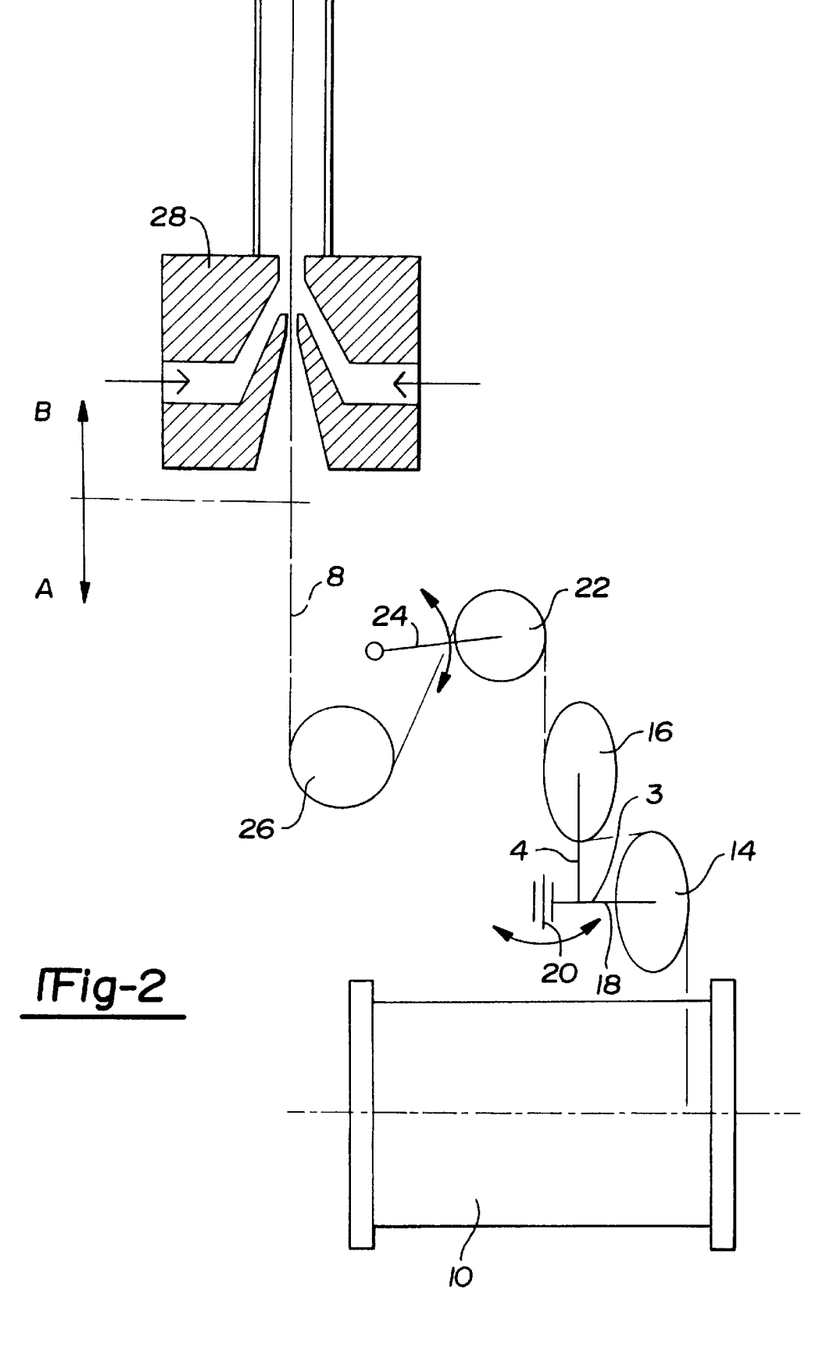
FIGS. 2 and 3, are schematic representations of wire unwinding devices.

An unwinding section A according to the invention is shown in FIG. 2. This section begins at the supply coil 10 and ends upstream of an injector nozzle 28. A total of 4 stabilizing deflection rollers 14, 16, 22, 26 are arranged between the supply coil 10 and the injector nozzle 28. The wire 8 is guided around these stabilizing deflection rollers 14, 16, 22, 26 as described below: initially, the wire extends counterclockwise around the right upper fourth of the first stabilizing deflection roller 14; subsequently, the wire extends clockwise around the left lower fourth of a second stabilizing deflection roller 16; and then counterclockwise around the upper half of a third stabilizing deflection roller 22; ultimately, the wire extends clockwise around the lower half of the remaining fourth stabilizing deflection roller 26.

All four stabilizing deflection rollers 14, 16, 22, 26 are arranged such that they can be turned about their respective center axes. In this case, the first and the second stabilizing deflection rollers 14, 16 are arranged on a swivel arm 18. However, the third and the fourth stabilizing deflection rollers 22, 26 are directly mounted on the electrical discharge machining apparatus via spring elements 24.

According to FIG. 2, the swivel arm 18 is situated above the supply coil 10. This swivel arm is arranged on the electrical discharge machining apparatus such that it can be turned about a rotational axis 20. In this case, the rotational axis 20 lies in a vertical line, with the supply coil 10 lying in a horizontal line.

The swivel arm 18 has two end sections 3, 4. The first end section 3 is arranged perpendicular to the rotational axis 20. The second end section 4 extends perpendicular to the end section 3 and parallel to the rotational axis 20. Viewed from the supply coil 10, the second end section 4 is always directed vertically upward. The first stabilizing deflection roller 14 is mounted on the end of the first end section 3; the second stabilizing deflection roller 16 is mounted on the end of the second end section 4. It is particularly practical to center the rotational axis 20 of the swivel arm 18 with respect to the longitudinal extent of the supply coil 10.

Consequently, the wire 8 extends as follows within the unwinding section A: from the supply coil 10, the wire is initially guided vertically upward around the right upper fourth of the first stabilizing deflection roller 14. After being deflected by approximately 90° in this fashion, the wire extends horizontally to the lower side of the second stabilizing deflection roller 16. After being guided around the left lower fourth of this stabilizing deflection roller, i.e., after being deflected again by approximately 90°, the wire reaches the right side of the third stabilizing deflection roller 22 while being directed vertically upward. The wire extends around this stabilizing deflection roller by approximately 180° in the clockwise direction. Subsequently, the wire extends downward in slightly oblique fashion toward the right side of the fourth stabilizing deflection roller 26.

The wire is wrapped around this stabilizing deflection roller by approximately 180° until it is finally introduced vertically upward into the injector nozzle 28.

The unwinding of the wire 8 from the supply coil 10 takes place as follows: initially, the end of the wire 8 is—as shown in FIG. 2—situated on the right side of the supply coil 10. Subsequently, this free end of the wire is guided around the stabilizing deflection rollers 14, 16, 22, 26 as described above and ultimately introduced into the injector nozzle 28. The wire is subsequently pulled into the ensuing sections of the wire transport system by means that are described in detail below. Consequently, the wire is unwound from the supply coil 10.

Since the wire 8 is, as described previously, wound around the core of the supply coil 10 in the shape of a spiral, the free end of the wire 8 travels from the right side to the left side of the supply coil 10 and then back to the right, etc. The swivel arm 18 follows this back and forward movement of the free end of the wire 8.

Consequently, it is possible to minimize the fluctuations that result from the winding of the wire 8 around the supply coil 10. However, the following aspects must be taken into consideration with respect to the previously described components: the point at which the wire 8 separates from the second stabilizing deflection roller 16 must lie as precisely as possible on an extension of the rotational axis 20 of the swivel arm 18. This also applies to the point at which the wire 8 comes in contact with the third stabilizing deflection roller 22. This means that the progression of the wire between the second stabilizing deflection roller 16 and the third stabilizing deflection roller 22 should coincide with the rotational axis 20.

Alternatively, it would also be possible to increase the diameter of the stabilizing deflection roller 16 and arrange said stabilizing deflection roller correspondingly further from the rotational axis 20 of the swivel arm 18, eliminating the stabilizing deflection roller 14 in this case. In such an embodiment, it merely would have to be observed that the outer circumferential surface of the supply coil 10 is arranged upstream of the extension of the rotational axis 20 of the swivel arm 18 or the rear circumferential section of the stabilizing deflection roller 16 such that the wire can be guided at least around a partial section of the enlarged stabilizing deflection roller 16.

Under certain circumstances, it may suffice if only the separation point of the wire 8 from the second stabilizing deflection roller 16 coincides with the rotational axis 20. In this way, the third stabilizing deflection roller 22 can be positioned more flexibly.

Since the progression of the wire in the previously described embodiment coincides with the extension of the rotational axis 20 of the swivel arm 18 directly behind the second stabilizing deflection roller 16, the rotational movement of the swivel arm does not affect the wire 8 that extends behind this section. Consequently, the back and forward movement of the wire 8 during the unwinding from the supply coil 10 is largely compensated. However, the third and fourth stabilizing deflection rollers 22, 26 are mounted directly on the electrical discharge machining apparatus, or via spring elements 24.

Figure 3:
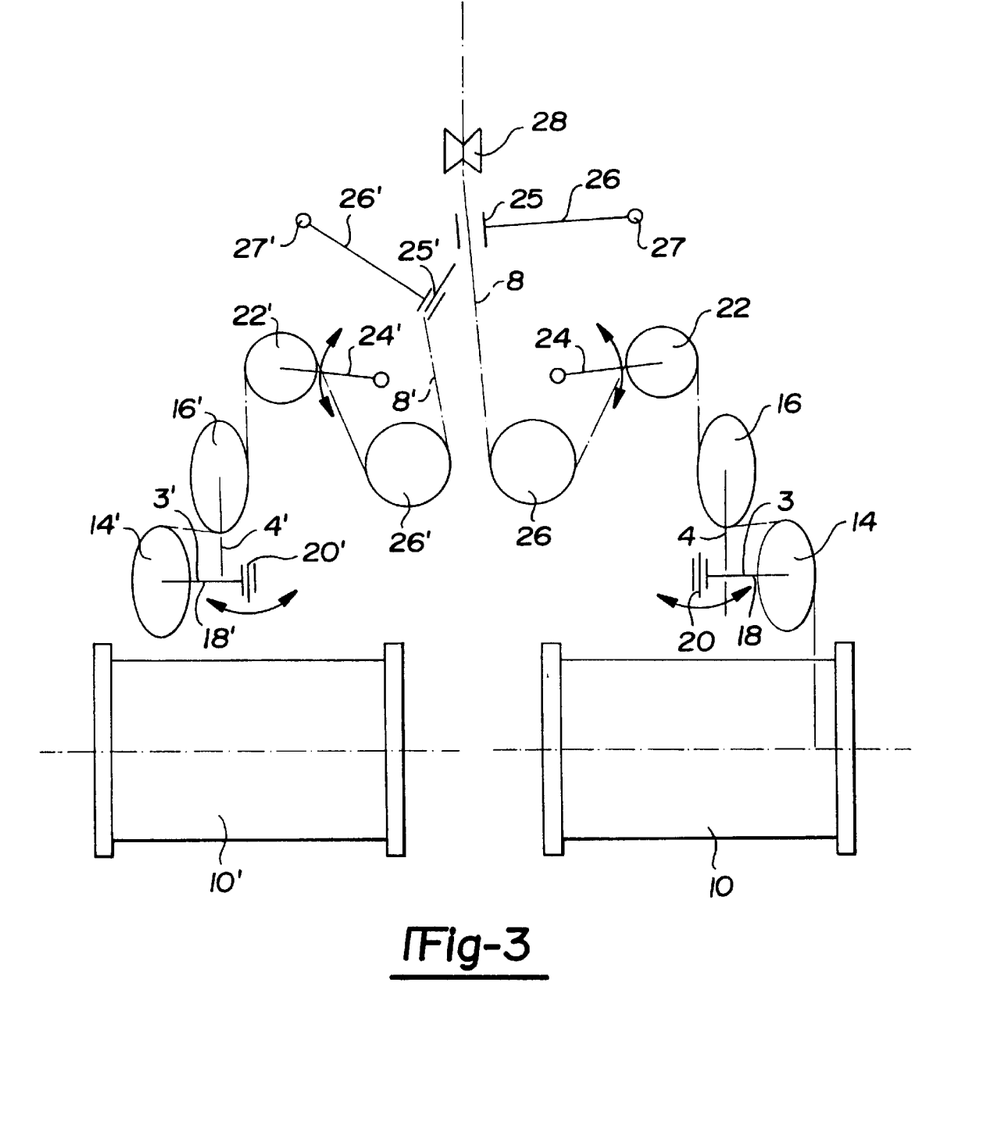

FIG. 3 shows that the previously described unwinding section A can also be constructed in multiple fashion on the electrical discharge machining apparatus. In this way, it is possible to reduce the interruptions in the processing of the workpiece 80 required for exchanging the supply coil 10 to a minimum. In an additional, automated wire transport system, the presence of an operator for the coil exchange is no longer required. This means that the time, during which the electrical discharge machining apparatus operates "independently," can be maximized. In addition, the wire diameter and/or the wire quality can be exchanged automatically.

The embodiment of a double unwinding section A shown in FIG. 3 essentially comprises a symmetrically arranged twin of the previously described unwinding section. Consequently, the additional components described below are provided: an additional supply coil 10', four additional stabilizing deflection rollers 14', 16', 22', 26', an additional swivel arm 18' with end sections 3' and 4' which is arranged such that it can be rotated about a rotational axis 20', and one additional wire 8'.

It is practical to provide two additional swivel arms 26, 26' in order to realize an automated coil exchange. These swivel arms are arranged such that they can be turned about the respective axis 27 or 27'. One respective eyelet is arranged on their free ends 25 or 25'. This type of construction allows the following: the operator places two full supply coils 10 or 10' into the intended positions. Subsequently, the operator guides both wires 8 and 8' around the respective number of stabilizing deflection rollers in the previously described fashion and ultimately around the corresponding eyelets 25 or 25', respectively. This measure makes it possible to turn the swivel arm 26 upward about the rotational axis 27 by means of a motor that is not shown in the figure. Consequently, the free end of the wire 8 can be transported into the intake section of the injection nozzle 28 (the injector nozzle 28 is only illustrated schematically in FIG. 3). The end of the first wire 8 may, for example, be detected by means of sensors. Consequently, it is possible, for example, to turn the swivel arm 26 downward again by means of an electronic control and turn the swivel arm 26' into the corresponding threading position about the rotational axis 27'.

2. Supply Section B

The supply section B shown in FIG. 1 begins at the injector nozzle 28 and ends at a guide head 76 that is arranged directly in front of the processing zone or the workpiece 80, respectively. In addition to the aforementioned components, this supply section comprises pipe sections 30, 32, 34, fluid-driven deflection rollers 36, 38, and a braking roller 40.

The injector nozzle 28 is actuated in order to thread the wire 8 and generates a fluid stream that guides the wire through the pipes 30, 32 and 34. The cross-sectional shape of the pipes may be chosen arbitrarily (for example, it is practical to utilize a telescopic pipe arrangement in order to compensate the movement of individual machine components; see below). Changes in the direction of motion are realized by means of the fluid-driven deflection rollers 36 and 38. The braking roller 40 is of particular importance for generating a defined wire tension. This braking roller is discussed in detail below under section II. Wire tension.

Consequently, the wire 8 extends as follows within the supply section B: initially, the wire passes through the injector nozzle 28 and the ensuing pipe section 30. Subsequently, it is deflected by approximately ¼ turn by the fluid-driven deflection roller 36 and then follows the progression of the pipe section 32. After being deflected anew by approximately ¼ turn by means of the fluid-driven deflection roller 38, the wire reaches the braking roller 40 via the pipe section 34, with the wire being looped once around said braking roller. Subsequently, the wire is transported into the processing zone via the guide head 78.

It was already mentioned previously that a fluid is used as the conveying means. It is, in principle, possible to utilize any fluid for this purpose. In an electrical discharge machining apparatus, two fluids are generally available in arbitrary quantities and almost free of charge, i.e., it is preferable to use one of these two fluids, namely the ambient air or the dielectric work fluid.

3. Disposal Section C

The disposal section C is also shown in FIG. 1. It directly follows the processing zone or workpiece 80 and begins at a lower guide head 78. This disposal section ends at a disposal container 94 and additionally comprises a suction nozzle 82, a pipe 84, two deflection rollers 86 and 88, tensioning rollers 90, and a wire cutting device 92.

The wire 8 and a threading stream of fluid are attracted by suction behind the guide head 78 by means of a suction nozzle 82, at least during the threading process. Subsequently, the wire 8 is transported through a pipe 84 of arbitrary cross section in this fluid stream. Changes in the direction of motion are realized with the aid of the deflection rollers 86 and 88. If the pair of rollers 90 is arranged vertically, the deflection rollers 86 and 88 can be eliminated.

Two rollers 90 that rotate in opposite directions and are driven by a tensioning motor (not shown) are arranged behind the last deflection roller 88. This tensioning motor generates the wire tension required for processing the workpiece 80 in cooperation with the braking roller 40. The required wire tension can, in principle, be adjusted or controlled arbitrarily. This motor also transports the wire to a wire cutting device 92, the rotational speed of which is proportional to the moving speed of the wire. Consequently, the wire is divided into sections of constant length. These wire sections are collected in a disposal container 84.

II. Wire Tension

1. Principle

The wire transport system according to the invention serves for attaining an optimal wire electrode in the processing zone, namely at the workpiece 80. In this case, it is particularly important to adjust or maintain the desired mechanical wire tension with this section as precisely as possible at all times.

The adjustment of the desired wire tension is, in principle, realized with the aid of three motors, namely the coil motor 12 and two motors that are not shown in the figures. These two motors drive the braking roller 40 and the tensioning roller 90. The tensioning motor for the tensioning rollers 90 ensures the desired transport speed of the wire. The braking roller 40 decelerates the wire 8 and thus generates the desired wire tension, in particular, around the workpiece 80 in the processing zone. For this purpose, the braking roller is driven with a suitable speed by the braking motor.

The interaction between the braking roller 40 and the wire 8 is based on rope friction. This friction is produced by a basic tension, to which the wire is already subjected within the sections A and B. The basic tension can be significantly lower than the desired work tension. It is produced by a suitable unwinding speed or a corresponding adjustment of the coil motor 12, respectively.

The main problem can be seen in changes or fluctuations of the wire length within the individual sections which are typical for electrical discharge machining apparatuses. Such length changes always cause changes in the wire tension and may, for example, be caused by the following reasons: within section A, due to the winding of the wire 8 on the coil 10; within sections A and B, due to taper cuts (if a taper cut is produced, the wire length in the processing zone is changed at the workpiece 80. In addition, a suitable relative position between the guide heads 76 and 78 and the workpiece 80 needs to be adjusted. For this purpose, it is frequently required to move carriages, on which components of the supply section B or even the unwinding section A are mounted. Consequently, it is possible that the arc length of the wire 8 changes on the deflection rollers 22 and/or 26; and, ultimately, within all sections due to an inaccurate guidance of the wire 8 on the different deflection rollers.

In order to counteract the latter problem, only deflection rollers that are provided with a uniform, circumferential V-shaped groove, in which the respective wire 8 is guided, should be used. This measure makes it possible to center the wire 8 with respect to the individual deflection rollers and prevent possible displacements.

If length changes of the wire 8 within the section A are caused by the wire 8 being wound onto the coil 10 in the shape of a spiral, i.e., from the left toward the right or from the right toward the left, these length changes can be compensated with the swivel arm 18 according to the invention.

The remaining length changes or fluctuations of the wire 8 are compensated as follows: within section A, the deflection roller 22 is fastened to the electrical discharge machining apparatus by means of spring elements 24. Consequently, a correlation between the spatial position of the deflection roller 22 and the tension of the wire 8 exists. If a sensor is used in order to continuously determine the current position of the deflection roller 22, it is, for example, possible to control the coil motor 12 with the data obtained in this manner. This measure makes it possible to maintain the position of the deflection roller 22 and consequently the tension of the wire 8 as constant as possible despite changes in the wire length that occur.

2. Embodiments

For economical reasons, it is desirable to largely automate the threading of the wire 8. Consequently, it is important that the individual components of the previously described wire transport system according to the invention are suitable for realizing such an automation. If the threading process is carried out manually, the corresponding components should make this manual threading as simple as possible. A few variations, in which such aspects of the wire transport system according to the invention are taken into consideration, are discussed below. These embodiments primarily pertain to the different design of the braking roller 40 or the structural components that surround this braking roller.

Figure 4:
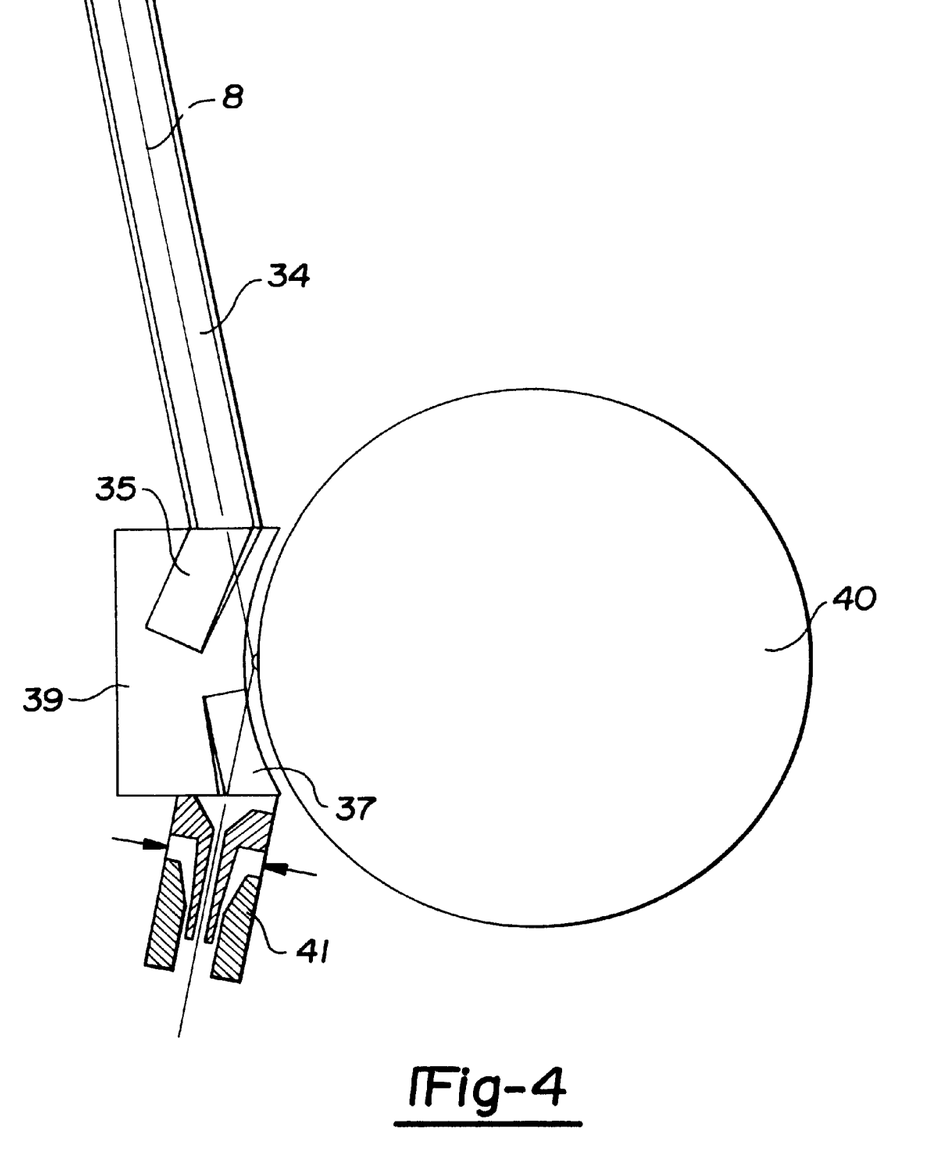
FIGS. 4–9, are schematic representations and/or cross sections of different embodiments of a braking roller system.

FIG. 4 shows a braking roller 40, around which the wire 8 is manually guided. In order to simplify this procedure, a manual threading aid 39 is arranged behind the pipe section 34. This threading aid is supplemented with an injector nozzle 41. Two intake grooves 35 and 37 are arranged on the manual threading aid 39. These intake grooves guide the wire into a position in which it can be easily taken hold of. The intake groove 37 allows the safe insertion of the wire into the injector nozzle 41.

The threading process is, for example, carried out as follows: the wire 8 is guided through the pipe section 34 and the intake groove 35 (if the manual threading aid 39 consists of an electrically conducting material that is resistant to wear, an automatic wire detector may be arranged at this location). Subsequently, the operator places the wire around the braking roller 40 and then into the intake groove 37. The additional threading process is carried out by the injector nozzle 41.

Figure 5:
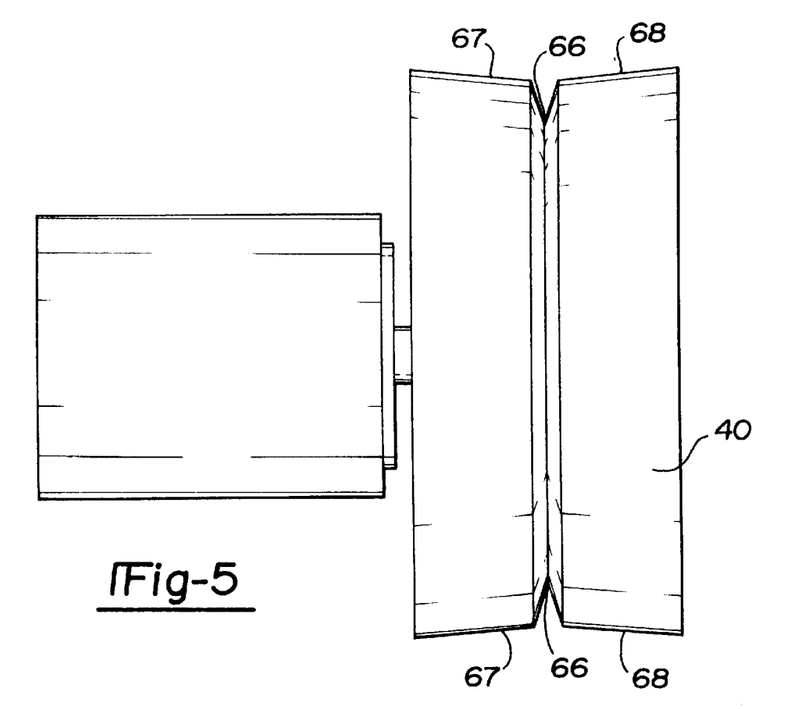

FIG. 5 shows a particularly practical design of the outer surface of the braking roller 40 for this embodiment as well as the following embodiments which show the surroundings of the braking roller 40. According to this figure, the braking roller is provided with bevels 67 and 68 in its circumferential surface, i.e, the wire 8 is guided in a V-groove 66. In this case, the V-groove 66 is centered with respect to the braking roller 40. Consequently, the most precise wire guidance possible is attained.

Figure 6:
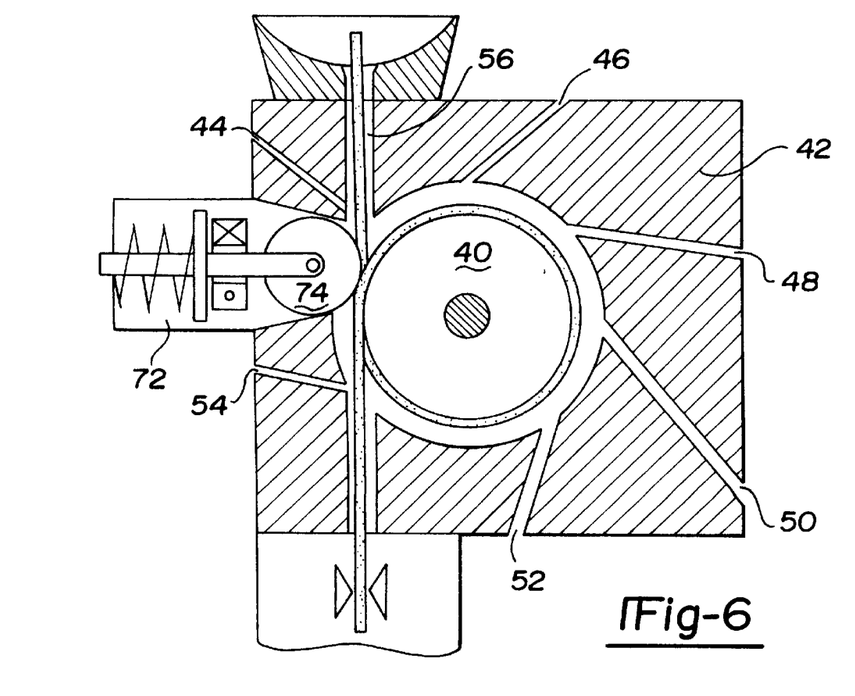

FIG. 6 shows suitable surroundings of the braking roller 40 for realizing an automated wire threading. In this case, the braking roller 40 is situated in the interior of a housing 42, on which openings for fluid streams 44–54 are arranged. In addition, a pressing roller 74 and a pressing mechanism 72 may be provided in order to promote the effect of the fluid streams.

The wire 8 can be threaded as follows: it extends to an opening 56 in the housing 42 of the braking roller 40 through the third pipe section 34.

In order to thread the wire, fluid streams are introduced tangentially to the braking roller 40 via additional housing openings 44, 46, 48, 50, 52 and 54. These fluid streams cause the wire 8 that is displaced during the threading process to adjoin the braking roller 40. In addition, the guiding of the wire 8 around the braking roller can be promoted by means of a corresponding rotational movement of the braking roller 40. Consequently, the wire 8 is looped around the braking roller 40 after the threading process (compare to EP-161657). The pressing roller 74 and the pressing mechanism 72 release the wire 8 during the threading process and subsequently press said wire against the braking roller 40. Should the wire break within the processing section, this measure prevents the wire from separating from the braking roller so that subsequently it can no longer be moved forward or threaded.

Figure 7:
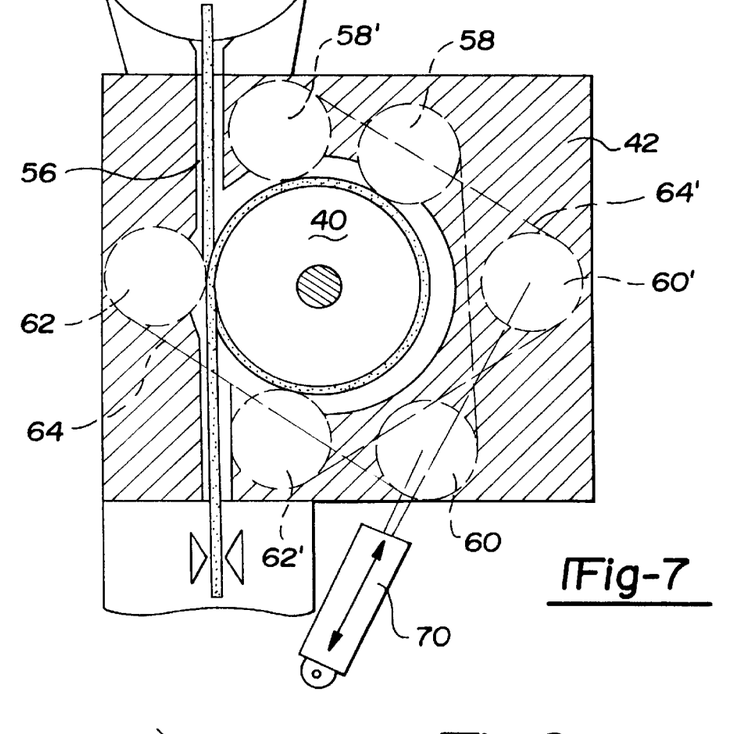

FIG. 7 shows one additional embodiment of the surroundings of the braking roller 40. A housing 42 is also provided in this figure. However, the fluid openings 44–54 are eliminated. Instead, a threading belt 64 is provided which is placed around part of the braking roller 40 with the aid of three rollers 58, 60, 62.

In this embodiment, the wire 8 is threaded as follows: at the beginning of the threading process, the rollers are situated in the respective positions 58, 60 and 62. Consequently, the threading belt adjoins the braking roller 40 in such a way that the wire 8, which moves forward during the threading process, is pushed into the section in which the threading belt 64 and the braking roller 40 adjoin one another. A pneumatically, electrically or hydraulically driven cylinder 70 subsequently turns the rollers into the respective positions 58', 60' and 62' such that the threading belt 64 and, in particular, its section that adjoins the braking roller 40 is turned into position 64'. The braking roller 40 is simultaneously turned in the counterclockwise direction, at least until the wire 8 is looped around the braking roller and emerges from the housing. This is possible because the rollers 58, 60, 62 and the threading belt 64 release this path when they are situated in the respective positions 58', 60', 62' and 64'.

Figure 8:
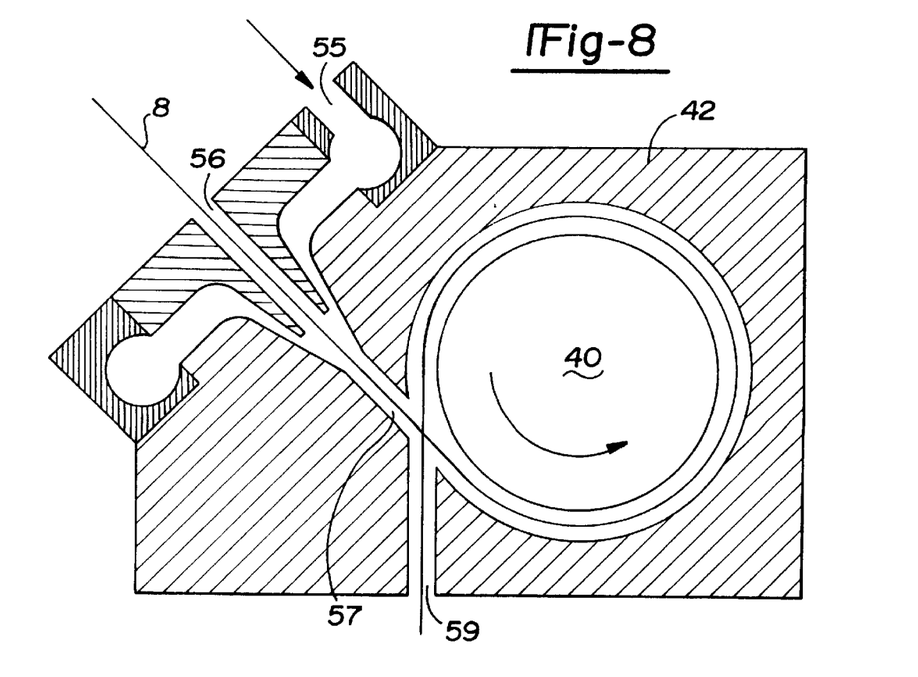

The alternative according to FIG. 8 shows a device for automatically looping the wire around the braking roller by introducing a fluid, in particular, air. For this purpose, the braking roller 40 is again situated in a housing 42. The wire 8 is guided into the interior of the housing 42 through an opening 56 in a channel system 57. A fluid is introduced through the opening 55. Consequently, the wire 8 is guided through the channel system 57 and around the braking roller 40, with the wire emerging from the housing 42 through an opening 59.

Figure 9:
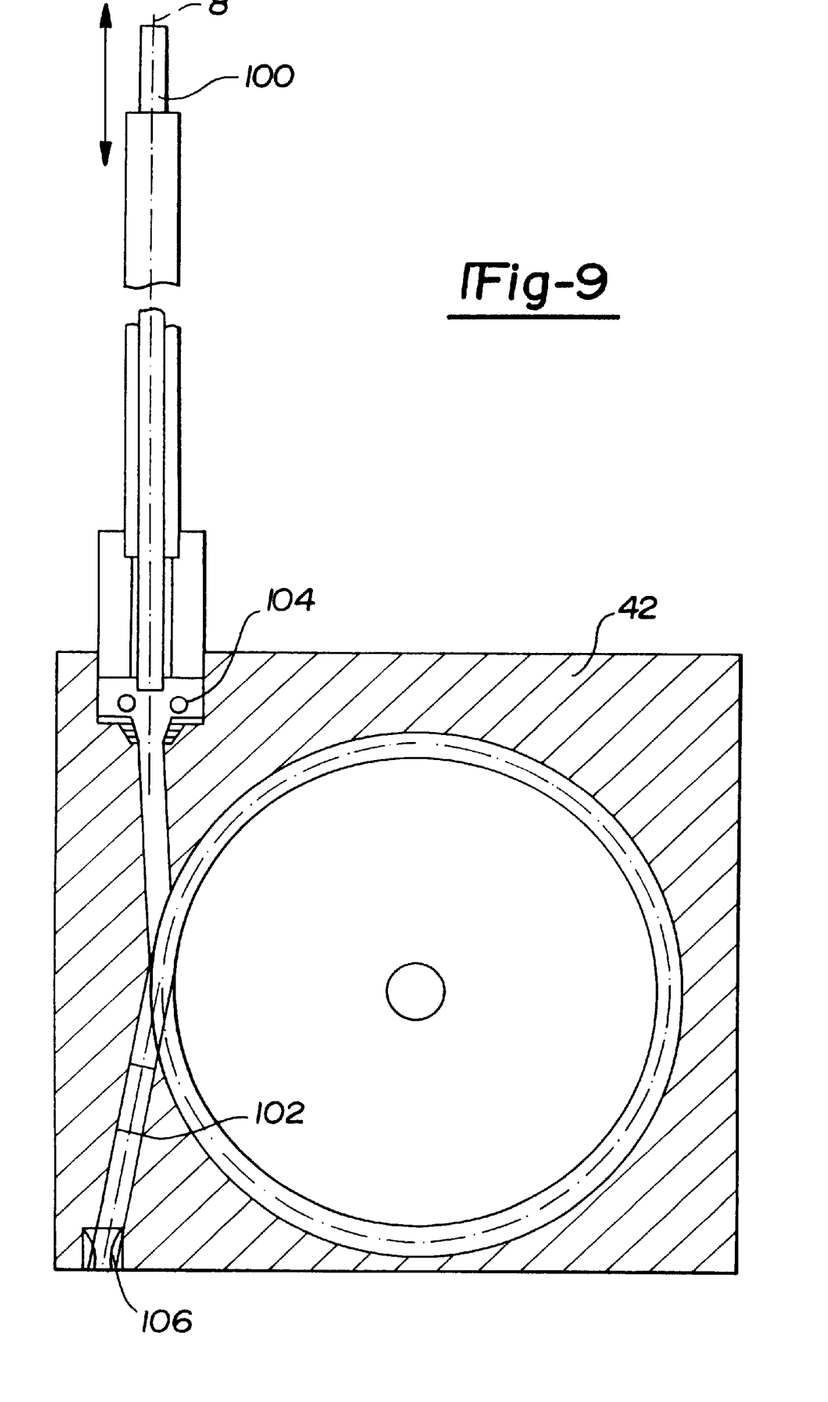

In FIG. 9, the braking roller 40 is also situated in a housing 42. The wire 8 is guided through a flexible guide pipe 100, namely either behind the pipe section 34 or in the interior of the pipe section 34. This flexible guide pipe 100 can be axially moved. As soon as the wire is introduced into the housing 42, it passes a detector 104. This causes an axial movement of the flexible guide pipe 100. During this process, the flexible guide pipe 100 is pushed around the braking roller 40 until it reaches an end position 102, with said guide pipe carrying the wire 8. From there, the wire 8 is additionally transported to an outlet opening 106. This entire process is promoted by the introduction of a fluid.

In all automated threading processes, the elasticity of the wire 8 is very important. This elasticity causes the wire 8 to bend away from the braking roller 40, i.e., the wire separates from the braking roller 40 again at the respective separation point. In case of a fluid-assisted method, the wire may, for example, be guided in the housing 42 by means of guide grooves. In this case, it is practical to offset the wire slightly along the axis of the braking roller 40 so as to prevent conflicts between the wire being introduced and the emerging wire. This effect may be promoted by a corresponding guide in the channel system 57.

We claim:

1. A wire transport system for an electrical discharge machining apparatus of the type having at least one wire electrode that moves in a processing direction during machining operations, the electrical discharge machining apparatus having a processing zone wherein a workpiece is processed, said wire transport system comprising:

an unwinding section including a storage means for storing the wire electrode prior to processing; and a supply section arranged between said unwinding section and said processing zone, said supply section including an essentially closed pipe arrangement for guiding the wire electrode from said unwinding section to an upper wire guide, said supply section having a means for generating a fluid stream in said pipe arrangement during insertion of the wire into the pipe arrangement, said supply section further including a deflection roller for changing a direction of movement of the wire, said deflection roller being driven by the fluid stream.

2. A wire transport system according to claim 1 wherein said wire deflection roller is arranged in a housing, said housing being mounted on a rotational axis.

3. A wire transport system according to claim 2 wherein a separation point of the wire from the roller lies on the rotational axis of said housing.

4. A wire transport system according to claim 1, wherein said unwinding section is realized in double, and additional auxiliary means for transferring the wire to said supply section are provided.

5. A wire transport system according to claim 1 further comprising a disposal section including a lower guide head, a tensioning motor, a suction nozzle and at least one pipe arranged behind said lower guide head so that said suction nozzle attracts the wire and a fluid by suction at least during a threading process, with the fluid transporting the wire to said tensioning motor through said pipe.

6. A wire transport system according to claim 5 characterized by the fact that changes in the direction of motion of the wire within said disposal section are, at least during the threading process, realized by means of deflection rollers that are driven by fluid streams.

7. A wire transport system according to claim 5 characterized by the fact that a wire cutting device is arranged behind said tensioning motor, and the rotational speed of the wire cutting device is proportional to a moving speed of the wire.

8. A wire transport system according to claim 1 wherein said pipe arrangement includes a pipe section that is telescopic.

9. A wire transport system according to claim 1 characterized by the fact that the deflection roller is realized in the form of a cylindrical disk, wherein a uniform, circumferential groove is arranged in the outer surface of the cylindrical disk, and wherein said groove is tapered symmetrical to the surface line in the direction toward the disk axis.

10. A wire transport system for an electrical discharge machining apparatus of the type having at least one wire electrode, the electrical discharge machining apparatus having a processing zone wherein a workpiece is processed, said wire transport system comprising:

an unwinding section including a storage means for storing the wire electrode prior to processing, said storage means comprising a supply coil that is driven by a coil motor, said unwinding section further comprising at least one stabilizing deflection roller the wire being unwound from said supply coil being initially guided around said at least one stabilizing deflection roller said stabilizing deflection roller being mounted on a swivel arm for rotation about a swivel axis, a separation point of the wire from said stabilizing deflection roller and a separation point of the wire from said supply coil always lying essentially vertically on top of one another during unwinding; and a supply section arranged between said unwinding section and said processing zone, said supply section including an essentially closed pipe arrangement for guiding the wire electrode from said unwinding section to an upper wire guide, said supply section having a means for generating a fluid stream in said pipe arrangement during insertion of the wire into the pipe arrangement.

11. A wire transport system for an electrical discharge machining apparatus of the type having at least one wire electrode, the electrical discharge machining apparatus having a processing zone wherein a workpiece is processed, said wire transport system comprising:

an unwinding section including a storage means for storing the wire electrode prior to processing, said storage means comprising a supply coil that is driven by a coil motor, said unwinding section further comprising at least one stabilizing deflection roller the wire being unwound from said supply coil being initially guided around said at least one stabilizing deflection roller said stabilizing deflection roller being mounted on a swivel arm for rotation about a swivel axis, the said unwinding section further comprising at least one additional deflection roller with the wire being guided around said deflection roller, said deflection roller being mounted in elastic fashion by means of a spring element, said unwinding section further comprising a measuring means for determining wire tension by means of a position of said additional deflection roller, said unwinding section further including a control unit for controlling said coil motor in response to measuring means; and a supply section arranged between said unwinding section and said processing zone, said supply section including an essentially closed pipe arrangement for guiding the wire electrode from said unwinding section to an upper wire guide, said supply section having a means for generating a fluid stream in said pipe arrangement during insertion of the wire into the pipe arrangement.

12. A wire transport system for an electrical discharge machining apparatus of the type having at least one wire electrode, the electrical discharge machining apparatus having a processing zone wherein a workpiece is processed, said wire transport system comprising:

an unwinding section including a storage means for storing the wire electrode prior to processing, said storage means comprising a supply coil that is driven by a coil motor, said unwinding section further comprising at least one stabilizing deflection roller the wire being unwound from said supply coil being initially guided around said at least one stabilizing deflection roller said stabilizing deflection roller being mounted on a swivel arm for rotation about a swivel axis, said rotational axis of said swivel arm big arranged essentially vertical to a rotational axis of said supply coil; and a supply section arranged between said unwinding section and said processing zone, said supply section including an essentially closed pipe arrangement for guiding the wire electrode from said unwinding section to an upper wire guide, said supply section having a means for generating a fluid stream in said pipe arrangement during insertion of the wire into the pipe arrangement.

13. A wire transport system according to claim 12, wherein said swivel axis of said swivel arm essentially coincides with a separation point of the wire from said stabilizing deflection roller.

14. A wire transport system for an electrical discharge machining apparatus of the type having at least one wire electrode that moves in a processing direction during machining operations, the electrical discharge machining apparatus having a processing zone wherein a work piece is processed, said wire transport system comprising:

an unwinding section including a storage means for storing the wire electrode prior to processing; and a supply section arranged between said unwinding section and said processing zone, said supply section including an essentially closed pipe arrangement for guiding the wire electrode from said unwinding section to an upper wire guide, said supply section further including a means for generating a fluid stream in said pipe arrangement during insertion of the wire into the pipe arrangement, said supply section further including a braking means for resisting movement of the wire in the processing direction, said braking means arranged such that the wire is acted on by said braking means prior to the wire reaching the upper wire guide, said braking means comprising a braking roller arranged in a housing, the wire passing around said braking roller prior to reaching the upper wire guide said housing including a wire opening for the wire to enter said housing and ajoin said braking roller said wire opening positioned such that the wire adjoins said braking roller in an essentially tangential fashion, and said housing further including at least one fluid opening for allowing a fluid stream to be introduced into said housing during threading of the wire about said braking roller, said fluid opening being arranged in said housing in such a way that the fluid stream is introduced into said housing essentially tangential to said braking roller for guiding the wire around said braking roller.

15. A wire transport system for an electrical discharge machining apparatus of the type having at least one wire electrode that moves in a processing direction during machining operations, the electrical discharge machining apparatus having a processing zone wherein a work piece is processed, said wire transport system comprising:

an unwinding section including a storage means for storing the wire electrode prior to processing; and a supply section arranged between said unwinding section and said processing zone, said supply section including an essentially closed pipe arrangement for guiding the wire electrode from said unwinding section to an upper wire guide, said supply section having a means for generating a fluid stream in said pipe arrangement during insertion of the wire into the pipe arrangement, said supply section further including a braking roller with the wire passing around said braking roller prior to reaching the upper wire guide, the wire being guided around the braking roller by means of a fluid.

16. A wire transport system according to claim 15 wherein an injector nozzle is arranged adjacent the braking roller.

17. A wire transport system according to claim 15 characterized by the fact that the braking roller is provided with bevels such that the wire is guided in a V-groove.

18. A wire transport system for an electrical discharge machining apparatus of the type having at least one wire electrode that moves in a processing direction during machining operations, the electrical discharge machining apparatus having a processing zone wherein a work piece is processed, said wire transport system comprising:

an unwinding section including a storage means for storing the wire electrode prior to processing; and a supply section arranged between said unwinding section and said processing zone, said supply section including an essentially closed pipe arrangement for guiding the wire electrode from said unwinding section to an upper wire guide, said supply section having a means for generating a fluid stream in said pipe arrangement during insertion of the wire into the pipe arrangement, said supply section further including a braking roller with the wire passing around said braking roller prior to reaching the upper wire guide, said supply section further including a flexible guide pipe for guiding the wire around the braking roller during a threading process.

19. A wire transport system for an electrical discharge machining apparatus of the type having at least one wire electrode, the electrical discharge machining apparatus having a processing zone wherein a work piece is processed, said wire transport system comprising:

an unwinding section including a storage means for storing the wire electrode prior to processing; and a supply section arranged between said unwinding section and said processing zone, said supply section including an essentially closed pipe arrangement for guiding the wire electrode from said unwinding section to an upper wire guide, said supply section further including a means for generating a fluid stream in said pipe arrangement during insertion of the wire into the pipe arrangement said supply section further including a braking roller with the wire passing around said braking roller prior to reaching the upper wire guide, said supply section further including a threading belt for guiding the wire around said braking roller during a threading process, said threading belt partially following the outer surface of said braking roller so that said threading belt guides the wire around said braking roller, said threading belt being arranged in movable fashion.

* * * * *